US010507795B1

(12) United States Patent
Schubert

(10) Patent No.: US 10,507,795 B1
(45) Date of Patent: Dec. 17, 2019

(54) VEHICLE-BASED PASSWORD

(71) Applicant: Ford Global Technologies, LLC, Dearborn, MI (US)

(72) Inventor: Jochen Schubert, Westland, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/055,458

(22) Filed: Aug. 6, 2018

(51) Int. Cl.
*B60R 25/23* (2013.01)
*H04L 9/08* (2006.01)
*B60R 25/24* (2013.01)

(52) U.S. Cl.
CPC ............ *B60R 25/23* (2013.01); *B60R 25/241* (2013.01); *B60R 25/248* (2013.01); *H04L 9/0863* (2013.01)

(58) Field of Classification Search
None
See application file for complete search history.

(56) References Cited

U.S. PATENT DOCUMENTS

| | | | |
|---|---|---|---|
| 6,617,961 B1 * | 9/2003 | Janssen | B60R 25/245 307/10.1 |
| 6,765,497 B2 | 7/2004 | Ablay et al. | |
| 8,768,565 B2 * | 7/2014 | Jefferies | G07B 15/00 701/32.7 |
| 9,399,445 B2 | 7/2016 | Abou Mahmoud et al. | |
| 9,628,875 B1 | 4/2017 | Roth et al. | |
| 9,842,443 B1 | 12/2017 | Weng et al. | |
| 9,947,153 B2 * | 4/2018 | Bergerhoff | B60R 25/04 |
| 2006/0164693 A1 * | 7/2006 | Matsumoto | H04N 1/32144 358/3.28 |
| 2010/0275010 A1 * | 10/2010 | Ghirardi | G06F 21/35 713/155 |
| 2016/0379430 A1 | 12/2016 | Kimura et al. | |
| 2017/0001598 A1 | 1/2017 | Pophale et al. | |
| 2017/0142205 A1 | 5/2017 | Makke et al. | |
| 2017/0243410 A1 * | 8/2017 | Caballero | G07B 15/063 |
| 2018/0013211 A1 * | 1/2018 | Ricci | H04L 9/321 |

FOREIGN PATENT DOCUMENTS

| | | |
|---|---|---|
| JP | 2016211157 A | 12/2016 |
| KR | 1020140002572 A | 1/2014 |
| KR | 1020170043778 A | 4/2017 |
| WO | 2014140490 A1 | 9/2014 |
| WO | 2015111794 A1 | 7/2015 |

OTHER PUBLICATIONS

Sutar et al., "Door Access Control in an Intelligent Car", International Journal of Engineering Trends and Technololgy (IJETT); vol. 4; Issue 4; Apr. 2013.

* cited by examiner

Primary Examiner — Carlos Garcia
(74) Attorney, Agent, or Firm — Brandon Hicks; Bejin Bieneman PLC

(57) ABSTRACT

A vehicle computer includes a memory and a processor. The processor is programmed to execute instructions stored in the memory. The instructions include to obtain input of one or more values displayed on a vehicle instrument panel and generate a password by combining the one or more input values and a stored secret key.

16 Claims, 3 Drawing Sheets

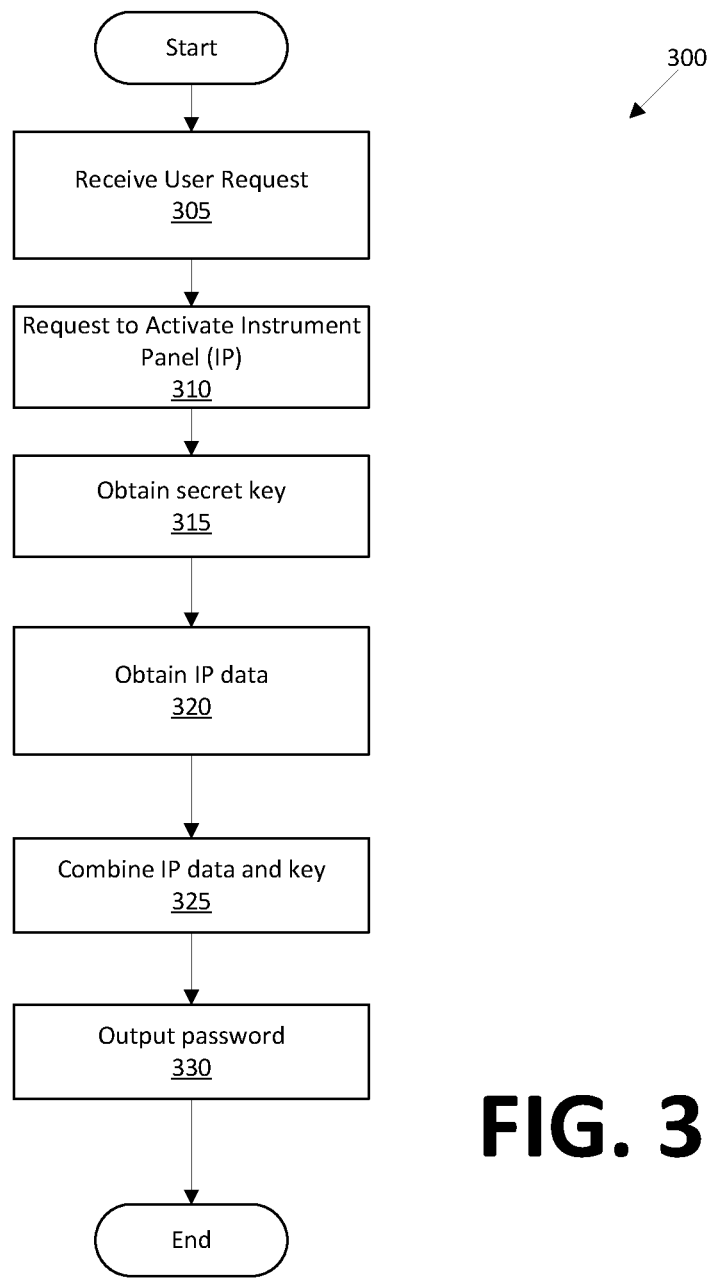

VEHICLE-BASED PASSWORD

BACKGROUND

Various mechanisms can be provided to allow a user to access and operate a vehicle. For example, where the vehicle is a multi-user vehicle, e.g., a vehicle to which a particular user may be provided temporary or one-time access, the user could be provided with a physical key, an electronic fob, etc., to allow the user to access and operate the vehicle. An authorized user might also be provided with means for electronic authentication, e.g., a password or PIN (personal identification number) that could be input via an interface provided on the vehicle. However, electronic authentication information (password, PIN, etc.) can be stolen or guessed, possibly allowing an unauthorized user to actuate vehicle functions, or may be lost or forgotten, preventing an authorized user from actuating vehicle functions.

BRIEF DESCRIPTION OF THE DRAWINGS

FIG. 3 is an exemplary process for generating a password.

DETAILED DESCRIPTION

Figure 1:
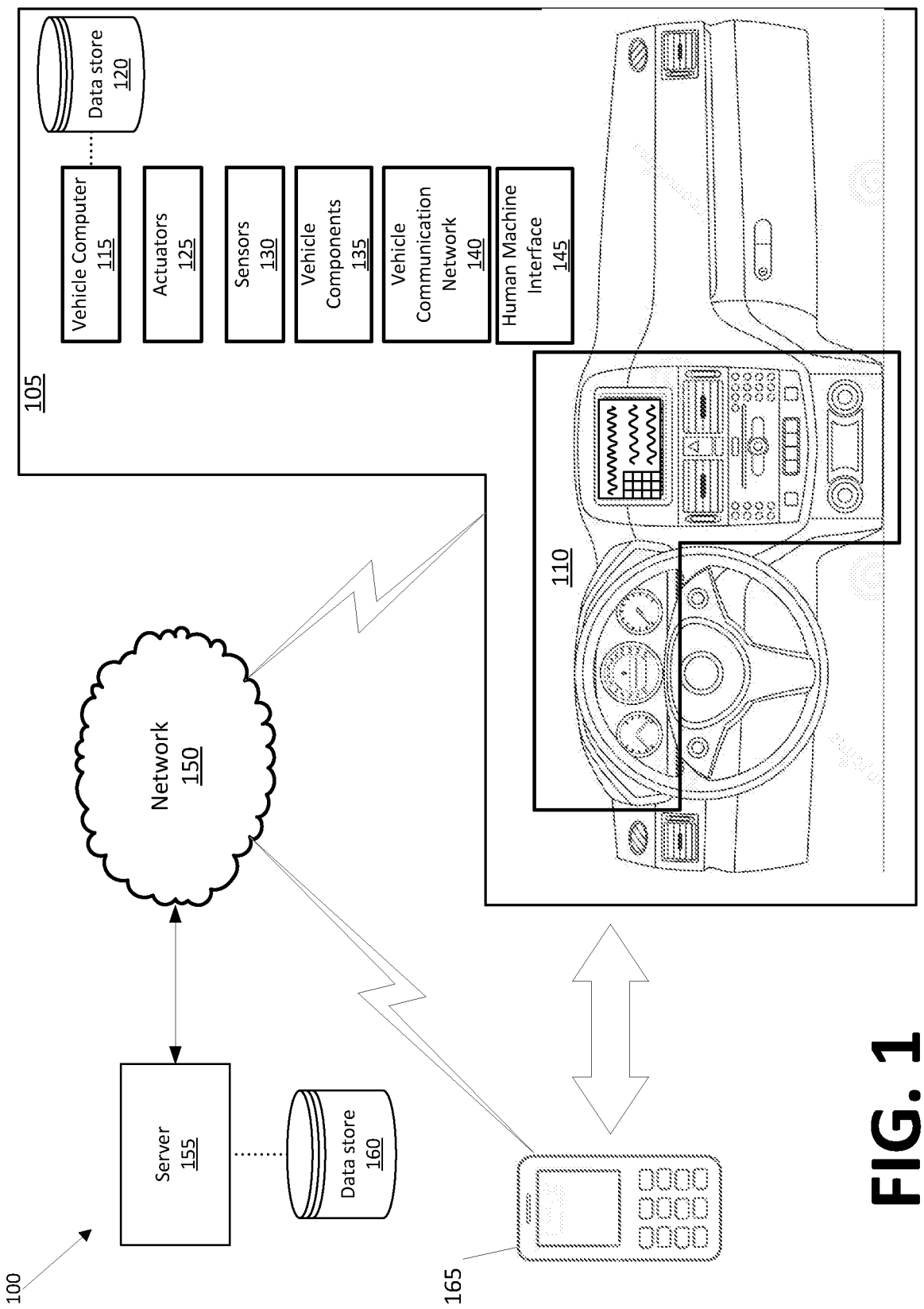
FIG. 1 is a diagram of an exemplary system for generating and verifying a password.

A system can comprise a vehicle computer that includes a memory and a processor programmed to execute instructions stored in the memory, the instructions including to obtain input of one or more values displayed on a vehicle instrument panel; and generate a password by combining the one or more input values and a stored secret key.

The system can further comprise a mobile computer that includes a memory and a processor programmed to execute instructions stored in the memory, the instructions including to obtain input of the one or more values displayed on the vehicle instrument panel; and generate the password by combining the one or more input values and the stored secret key. The mobile computer can be further programmed to transmit a request to the vehicle computer to actuate the vehicle instrument panel to display the one or more values.

The vehicle computer can be further programmed to receive the request and to actuate the vehicle instrument panel to display the one or more values upon receipt of the request.

The vehicle computer can be further programmed to receive input providing the password. The vehicle computer can be further programmed to actuate a vehicle component upon confirming that the received input includes the password. The input can be received via wireless communication between the vehicle computer and a mobile computer.

The vehicle computer can be further programmed to select the secret key from a plurality of secret keys based on a user identification.

A method can comprise obtaining, in a vehicle computer, input of one or more values displayed on a vehicle instrument panel; and generating a password by combining the one or more input values and a stored secret key.

The method can further comprise obtaining, in a mobile computer, input of the one or more values displayed on the vehicle instrument panel; and generating the password by combining the one or more input values and the stored secret key. The method can further comprise, in the mobile computer, transmitting a request to the vehicle computer to actuate the vehicle instrument panel to display the one or more values.

The method can further comprise, in the vehicle computer, receiving the request and actuating the vehicle instrument panel to display the one or more values upon receipt of the request. The method can further comprise, in the vehicle computer, receiving input providing the password.

The method can further comprise, in the vehicle computer, actuating a vehicle component upon confirming that the received input includes the password. The method can further comprise, in the vehicle computer, receiving the input via wireless communication between the vehicle computer and a mobile computer.

The method can further comprise, in the vehicle computer, selecting the secret key from a plurality of secret keys based on a user identification.

A system can comprise a vehicle computer programmed to obtain input of one or more values being displayed on a vehicle instrument panel; and generate a password by combining the one or more input values and a stored secret key; and a mobile computer programmed to obtain input of one or more values being displayed on the vehicle instrument panel; and generate the password by combining the one or more input values and the stored secret key. The mobile computer can be further programmed to output the password. The vehicle computer can be further programmed to receive input providing the password. The vehicle computer can be further programmed to actuate a vehicle component upon confirming that the received input includes the password.

A vehicle can include a vehicle security system for preventing an unauthorized user from accessing and/or operating the vehicle. A vehicle computer is programmed to generate the password by combining one or more values specifying one or more respective vehicle states with a stored secret key. The values are typically available on a vehicle network, e.g., a Controller Area Network (CAN) bus, and may include values that can be displayed on a vehicle instrument panel, such as a current vehicle odometer reading, a vehicle fuel tank level and/or state of battery charge, a current ambient temperature, etc. Further, the values may be provided to a user device such as a smartphone or the like, e.g., via a user device camera capturing an image of a vehicle instrument panel or HMI displaying values, via a user device camera capturing a machine-readable code or image such as a QR code that includes the values, via wireless communications or user input, so that the user device, which stores the secret key, can also generate the password. The vehicle computer can then authenticate the user to access and/or operate the vehicle upon receiving the password via user input and/or from the user device, e.g., wirelessly.

FIG. 1 illustrates an authentication system 100 for a vehicle 105. The vehicle 105 includes an instrument panel 110, a vehicle computer 115, a data store 120, actuator(s) 125, sensor(s) 130, vehicle components 135, a vehicle communication network 140, and a human machine interface (HMI) 145. The vehicle computer 115 includes programming to generate a one-time password (OTP) using a stored secret key and one or more values obtained via the vehicle network 140. A user device 165 may be in wired and/or wireless communication with the vehicle computer 115, and is programmed to generate the OTP based on the secret key and the one or more values from the vehicle network 140. The vehicle 105 may be powered in a variety of known ways, e.g., with an electric motor and/or internal combustion engine. The vehicle 105 may be a land vehicle such as a car, truck, etc.

The vehicle computer 115 includes a processor and a memory such as are known. The memory includes one or more forms of computer-readable media, and stores instructions executable by the vehicle computer 115 for performing various operations, including as disclosed herein.

The vehicle 105 can be non-autonomous, semi-autonomous, and/or autonomous. The vehicle computer 115 may operate the vehicle 105 in an autonomous or a semi-autonomous mode and/or may control and/or monitor vehicle 105 components 135 in a non-autonomous mode. For purposes of this disclosure, an autonomous mode is defined as one in which each of vehicle 105 propulsion, braking, and steering are controlled by the vehicle computer 115; in a semi-autonomous mode the vehicle computer 115 controls one or two of vehicles 105 propulsion, braking, and steering; in a non-autonomous mode, an operator controls the vehicle 105 propulsion, braking, and steering.

The vehicle computer 115 is programmed to generate a password, e.g., an OTP, by combining the values from the vehicle network 140 with a stored secret key. The computer 115 is further programmed to receive an input, verify the received input includes the password, and actuate the vehicle 105, e.g., allow a user to access and/or control one or more vehicle 105 components 135 and/or allow the computer 115 to operate the vehicle autonomously or semi-autonomously. The vehicle computer 115 may be further programmed to generate the secret key, e.g., using a random generation technique, which can then be shared with the server 155 to be shared with a user device 165 and/or other vehicle computers 115.

The vehicle computer 115 may further include programming to operate one or more of land vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the vehicle computer 115, as opposed to a human operator, is to control such operations. Additionally, the vehicle computer 115 may be programmed to determine whether and when a human operator is to control such operations.

The vehicle computer 115 may include or be communicatively coupled to, e.g., via a vehicle 105 communications bus as described further below, more than one processor, e.g., controllers or the like included in the vehicle 105 for monitoring and/or controlling various vehicle controllers, e.g., a powertrain controller, a brake controller, a steering controller, etc. The vehicle computer 115 is generally arranged for communications on the vehicle communication network 140 that can include a bus in the vehicle 105 such as a controller area network (CAN) or the like, and/or other wired and/or wireless mechanisms, e.g., Ethernet, WiFi®, etc.

Via the vehicle communication network 140, the vehicle computer 115 may transmit messages to various devices in the vehicle 105 and/or receive messages from the various devices, e.g., an actuator 125, an HMI 145, etc. Alternatively or additionally, in cases where the vehicle computer 115 actually comprises multiple devices, the vehicle communication network 140 may be used for communications between devices represented as the vehicle computer 115 in this disclosure. Further, as mentioned below, various controllers and/or sensors 130 may provide data to the vehicle computer 115 via the vehicle communication network 140.

In addition, the vehicle computer 115 may be configured for communicating through a wireless vehicular communication interface with various devices external to the vehicle 105, e.g., a mobile computer such as a user device 165, other vehicle computers, infrastructure computers, etc., e.g., via a protocol such as Bluetooth® or the like, a vehicle-to-device communication network and/or a vehicle-to-infrastructure communication network. The one or more mechanisms by which the vehicle computers 115 may communicate with external devices, may include one or more of wireless communication mechanisms, including any desired combination of wireless (e.g., cellular, wireless, satellite, microwave and radio frequency) communication mechanisms and any desired network topology (or topologies when multiple communication mechanisms are utilized). Exemplary vehicular communication mechanisms include cellular, Bluetooth, IEEE 802.11, dedicated short range communications (DSRC), and/or wide area networks (WAN), including the Internet, providing data communication services. The computer 115 may also communicate with other devices by providing visual output or indicia, e.g., providing visual indicia that can be captured by a user device 165 camera such as data values, and/or a machine-readable code or image such as a QR code that allows the device 165 to obtain or decide the values, displayed on vehicle instrument panel 110 or HMI 145.

The data store 120 may be of any known type, e.g., hard disk drives, solid-state drives, servers, or any volatile or non-volatile media. The data store 120 typically stores the secret key, from which the vehicle computer 115 can retrieve the secret key. The secret key is described further below.

The vehicle 105 actuators 125 are implemented via circuits, chips, or other electronic and/or mechanical components that can actuate, i.e., cause mechanical movement of various vehicle subsystems or components 135 in accordance with appropriate control signals or commands as is known. The actuators 125 may be used to control the instrument panel 110, an engine ignition system, an engine propulsion system, and door locks of the vehicle 105.

The sensors 130 may include a variety of devices to provide data to the vehicle computer 115. For example, the sensors 130 may include one or more camera, radar, infrared, and/or LIDAR (Light Detection and Ranging) sensors 130 disposed in or on the vehicle 105 to provide data encompassing at least some of the vehicle 105 exterior. The data may be received by the vehicle computer 115 via the vehicle communication network 140. As an example, a door sensor 130 may provide an electrical signal indicating a vehicle 105 door has been opened, as discussed further below. The vehicle computer 115 may receive sensor 130 data and operate the vehicle 105 based at least in part on the received data, as further explained below.

The instrument panel 110 is typically located in a passenger cabin of the vehicle 105. The instrument panel (IP) 110 typically includes one or more displays to provide values obtained from the vehicle 105 network 140, such as vehicle speed, odometer reading (e.g., mileage), fuel level, status of vehicle 105 doors (e.g., open or closed), external temperature reading, current radio station and/or status of other vehicle 105 components 135, e.g., tires, engine, lights, etc.

The HMI 145 may be included in the IP 110 and/or may be provided separately. The HMI 145 typically includes one or more elements for providing output to a user, e.g., a display and/or a speaker, and one or more elements for receiving user input, e.g., a touchscreen display, a keyboard, a microphone, etc. As an example, the vehicle computer 115 may be programmed to request user input via the HMI 145. The HMI 145 may be further configured to receive user input. As an example, the vehicle computer 115 may be programmed to receive input including a password via the HMI 145. The HMI 145 may be located in the passenger compartment of the vehicle 105, e.g., in the instrument panel 110 as shown in FIG. 1.

The system 100 further typically includes a wide area network 150, a server 155, a second data store 160, and a user device 165. The network 150 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The server 155 may include or be communicatively coupled to the second data store 160 for storing collected data, records relating to users and vehicles 105 as described herein, and may be programmed to store, generate, and or provide to user devices 165 and/or computers 115, secret keys. For example, the server 155 may be programmed to generate a secret key and provide the secret key to a vehicle computer 115. The server 155 may be further programmed to receive input that a specified user device 165, e.g., based on authentication via an app or the like on the user device 165 in communication with the server 155, is to be used to obtain initial access to a specified vehicle 105 (by which it is meant that the user can access a vehicle cabin so as to be able to view a vehicle 105 HMI 145 and/or IP 110, e.g., vehicle 105 doors may be unlocked and/or opened to facilitate access), e.g., identified according to a vehicle identification number (VIN) or other substantially unique identifier. The server 155 may be further programmed to provide a secret key to a vehicle computer 115 and/or a user device 165. In one example, upon authentication of a user device 165, the server 155 could then provide a same secret key to the user device 165 and to the computer 115 of the specified vehicle 105. In another example, the server 155 could be programmed to store a record or records of respective secret keys provided to vehicles 105, and to provide the secret key for a vehicle 105 to a user device 165 upon receiving input and/or authentication that the user device 165 is to be used to access the specified vehicle 105. In another example, the server 155 may be programmed to receive a secret key generated in one of the vehicle computer 115 and the user device 165 and to transmit the secret key to the other of the vehicle computer 115 and the user device 165 via the network 150.

The user device 165 may be any one of a variety of computing devices including a processor and a memory, e.g., a smartphone, a tablet, a personal digital assistant, etc. The user device 165 typically includes one or more elements for providing output to a user, e.g., a display and/or a speaker, and one or more elements for receiving user input, e.g., a touchscreen display, a keyboard, a microphone, a camera, etc. The user device 165 may be programmed to generate the secret key, e.g., using a random generation technique, which can then be shared with the server 155 to be shared with other user devices 165 and/or vehicle computers 115. The user device 165 may use various wired and/or wireless technologies, such as the network 150 to communicate with the server 155. In addition to the network 150, the user device 165 may use Bluetooth, WiFi, Near Field Communication (NFC), and Radio-frequency identification (RFID) to communicate with the vehicle computer 115.

The vehicle computer 115 and the user device 165 may share a secret key. The secret key may be generated by the server 155, the vehicle computer 115, or the user device 165 and provided to one or both of the vehicle computer 115 and the user device 165, as discussed below. In response to user input, the user device 165 can transmit a request to the vehicle computer 115 to activate the IP 110 to display (or alternatively to transmit, e.g., via Bluetooth or the like) vehicle data to be combined with the shared secret key by each of the computer 115 and the user device 165. The vehicle data can include data values obtained from a CAN bus or the like, such as a current odometer reading, fuel level, ambient temperature, etc., on the IP 110 (or alternatively or additionally on the HMI 145). Based on the vehicle data values input to the user device 165 by a user perceiving the display on the IP 110, the user device 165 can combine the vehicle data and the secret key to generate a password, as described below. The computer 115 can similarly combine the data values and the secret key to generate the password. The user device 165 can display the password, whereas the computer 115 does not. A user can then input the password generated by the user device 165 into the vehicle computer 115 via the HMI 145. The vehicle computer 115 can determine whether the password generated by the user device 165 matches the password generated by the vehicle computer 115. If the passwords match, the vehicle computer 115 can actuate one or more vehicle components 135, e.g., an ignition or starter, so permitting, for example, the user to operate the vehicle 105.

Figure 2:
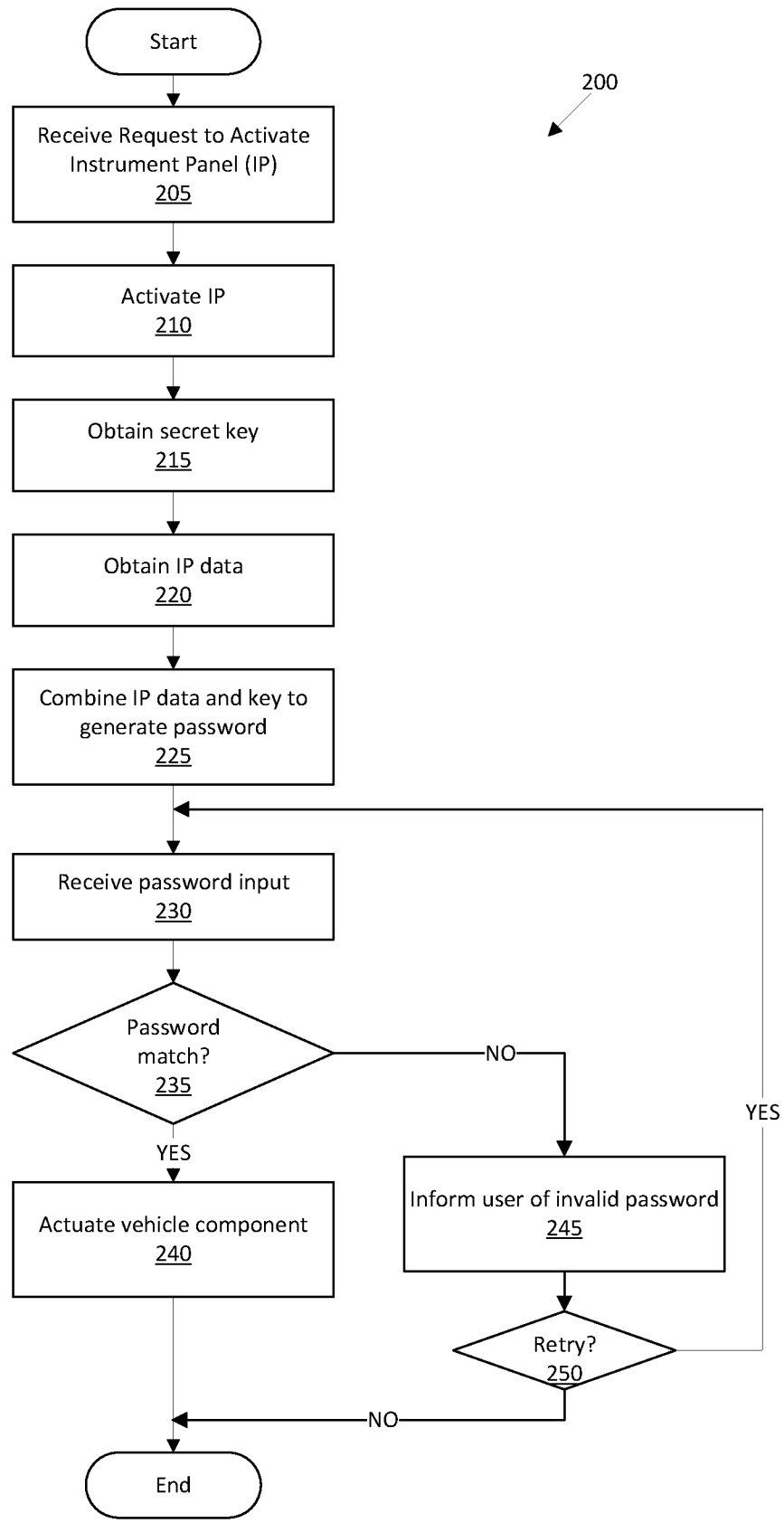
FIG. 2 is an exemplary process for actuating a vehicle component based on a password.

FIG. 2 illustrates a process 200 for actuating a vehicle component 135 based on a received input. The process 200 can be carried out by the computer 115 executing programming stored in its memory.

The process 200 may begin in a block 205, when the vehicle computer 115 receives an input to activate the instrument panel 110. As an example, the input may be a request from a user device 165. The request may be a message from the user device 165 to the vehicle computer 115 to activate the instrument panel 110, e.g., illuminate the vehicle displays and show vehicle data for various vehicle data fields such as a current odometer reading, estimated distance-to-empty, current fuel efficiency, external temperature reading, and/or a current radio station.

As another example, the input to activate the instrument panel 110 may be a signal from the door sensor 130 when the door is opened. The door sensor 130 may include a spring-activated button and an electric circuit connected to the vehicle computer 115. When the door is closed, the spring-activated button is depressed, opening the electric circuit. When the door is open, the spring-activated button extends, closing the electric circuit and outputting a signal to the vehicle computer 115, via the vehicle communication network 140, indicating the door is open.

Next, in a block 210, the vehicle computer 115 activates the instrument panel 110 in response to the input received in the block 205. Upon receiving the input, the vehicle computer 115 activates the instrument panel 110 and the HMI 145. When the instrument panel 110 is activated, the instrument panel 110 displays vehicle data obtained from the vehicle communication network 140, e.g., vehicle data that is typically available via a CAN bus or the like, such as the current odometer reading (e.g., miles or kilometers), estimated distance-to-empty (e.g., miles-to-empty), current fuel efficiency (e.g., Miles Per Gallon (MPG) or kilometers per liter), external temperature reading (e.g., Celsius or Fahrenheit), and current radio station. When the HMI 145 is activated, the HMI 145 is ready to display data to and/or receive input from the user.

Next, in a block 215, the vehicle computer 115 obtains the secret key. The secret key may be a data value stored in the data store 120. The secret key is typically stored as a set of data bits, e.g., representing string of numeric or alphanumeric characters. The secret key and one or more values may be input to an algorithm, resulting in an output that may be used as a substantially unique identifier, e.g., a one-time password. As an example, the secret key and a plain-text value such as a current odometer reading can be combined as inputs to an algorithm that concatenates and/or multiplies values to create an output data value that may be used as a one-time password.

The secret key may be provided to the user device 165 and the vehicle computer 115 by the server 155 when the user is initially authorized to access the vehicle 105, as described above. Alternatively, the server 155 may periodically (e.g. monthly, annually, etc.) update the secret key and provide the updated secret key to the user device 165 and the vehicle computer 115. Yet further alternatively, as mentioned above, the computer 115 and/or user device 165 could be programmed to generate the secret key. To obtain the secret key, the user may input, via the user device 165, a user identification, e.g., a user's name and/or a substantially unique alpha-numeric identifier, and a substantially unique vehicle identifier, e.g., a Vehicle Identification Number (VIN) or the like. The user device 165 can provide this input to the server 155, which can then verify that the requesting user device 165, i.e., based on the provided user identification, is authorized to access the specific vehicle 105. The server 155 may then retrieve or generate a secret key, e.g., using a random data generating function, accessing a previously-generated key stored in the second data store 160 and associated with the specific vehicle 105, etc. The server 155 may transmit the secret key to a user device 165 memory and/or to the data store 120 in the vehicle 105, e.g., as discussed above.

As an alternative to receiving the secret key from the server 155, the vehicle computer 115 may verify that the user device 165 is initially authorized to access the vehicle 105, generate the secret key, e.g., using a random data generating technique, transmit the secret key to the user device 165 memory, and store the secret key in the data store 120. Yet further alternatively, as mentioned above, the user device 165 could generate the secret key.

The vehicle computer 115 may retrieve the secret key from the data store 120. In one example, where the vehicle 105 may be accessed by multiple users, the data store 120 may include a plurality of secret keys. Each secret key may be associated to a respective user. In such a case, the vehicle computer 115 may retrieve the secret key associated to a user based on user identification. The vehicle computer 115 may receive the user identification from the user device 165, as part of the request to activate the instrument panel 110. Alternatively, the vehicle computer 115 may prompt the user, via the HMI 145, to input the user identification.

In a block 220, the vehicle computer 115 obtains one or more values (i.e., vehicle data) being displayed on the instrument panel 110. The vehicle data may be combined with the secret key to generate the password, as discussed above and as further explained in a block 225. The vehicle computer 115 may access the vehicle data via the vehicle communication network 140. As an example, an odometer value (e.g., a current mileage value) is stored in an Electronic Control Unit (ECU) and the ECU repeatedly broadcasts the current odometer value over the vehicle communication network 140. For example, the vehicle computer 115 can monitor the vehicle communication network 140 for a data frame having an identifier for a current mileage value, and upon identifying a data frame including the current mileage identifier, retrieve the data frame and extract the current mileage value from the data frame.

The vehicle computer 115 may select vehicle data to be used to generate the password, e.g., selecting one or more data fields from a set of possible data fields, e.g., fields such as listed above, on a random or pseudo-random basis, or the data fields to be used could be pre-determined, e.g., the vehicle computer 115 and/or the user device 165 could each be programmed for an external temperature value and a mileage value, to take just one of many possible examples, to be combined with the secret key.

After selecting the data field(s) to be used for generating the password, the vehicle computer 115 may cause a display of the selected data field(s) on the HMI 145 for the user to observe. As another example, the vehicle computer 115 may cause only the selected data field(s) to be displayed on the IP 110 with ordered letters, numbers, or other markers indicating an order in which the vehicle data is to be inputted. Additionally and/or alternatively, the vehicle computer 115 may transmit the data field(s) and/or the values of the selected data field(s) to the user device 165 via e.g., the network 150 and the server 155, Bluetooth or WiFi. Where two or more data fields have been selected, the vehicle computer 115 may select, and display or transmit to the user device 165 an order in which the vehicle data is to be inputted.

As an addition or alternative to using the vehicle data from selected data field(s) to generate the password, the vehicle computer 115 may generate a cryptographic nonce to be combined with the secret key to generate the password, e.g., as explained above. In such a case, the vehicle computer 115 may generate the cryptographic nonce using a random data function and a predetermined seed such as a timestamp internal to the vehicle computer 115. The vehicle computer 115 may display the generated cryptographic nonce on the HMI 145 for the user to see, such that the user can input the cryptographic nonce into the user device 165. Additionally and/or alternatively, the vehicle computer 115 may transmit the generated cryptographic nonce to the user device 165.

Next, in the block 225, the vehicle computer 115 may combine the selected vehicle data or the cryptographic nonce with the secret key using a cryptographic algorithm or a One-Time Password (OTP) algorithm.

A cryptographic algorithm includes a mathematical function typically used to encrypt and decrypt text, i.e., transform plaintext to ciphertext, and ciphertext to plaintext, respectively. The cryptographic algorithm may be applied on two or more data values, one value being the secret key and the other values being the plaintext, to generate an encrypted value. The cryptographic algorithm applied may be any suitable cryptographic algorithm such as Data Encryption Standard (DES) or Advanced Encryption Standard (AES).

An OTP algorithm is a mathematical algorithm that can be used to generate a password that is only valid for a single login. An OTP algorithm such as a HOTP (HMAC(Hash-based Message Authentication Code)-based One-Time Password) algorithm may receive inputs including the secret key and a message, and may apply the inputs to a cryptographic hash function such as Secure Hash Algorithm 1 (SHA-1), to generate a hash (i.e., an encrypted bit string of a fixed size). In the case of SHA-1, the resulting hash is a 160-bit value, and may be truncated to a 6- to 8-digit number by applying a modulo $10^n$ operation, where n is desired number of digits.

As an example, the vehicle computer 115 may apply an OTP algorithm as described above. In such a case, the vehicle computer 115 may input the shared secret key and the selected data values (e.g., the vehicle data from selected data fields and/or the cryptographic nonce) into the cryptographic hash function. Where there are two or more selected data values, the data values may be concatenated in the order selected by the vehicle computer 115. The vehicle computer 115 stores, but does not display or otherwise output for user perception, the generated password.

In the block 230, the vehicle computer 115 waits to receive an input. The vehicle computer 115 may receive the input from the user via the HMI 145, e.g., the vehicle computer 115 may prompt the user to enter the input on a keypad of the HMI 145. As another example, the input may be transmitted to the vehicle computer 115 from the user device 165. In such an example, the vehicle computer 115 may send a message to the user device 165 requesting the input, via the network 150 or Bluetooth, and the user device 165 may transmit the input to the vehicle computer 115, via the network 150 or Bluetooth.

Next, in a decision block 235, the vehicle computer 115 determines whether the received input specifies the password. The vehicle computer 115 compares the received input to the password. If the received input matches the password, the process 200 goes to a block 240; otherwise, the process 200 goes to a block 245.

In the block 240, the vehicle computer 115 actuates one or more components of the vehicle 105, e.g., a starter or ignition that allows the vehicle 105 to operate in a drive mode, in response to the received input matching the password. As an example, the vehicle computer 115 may send a command to a vehicle component 135 such as an ignition or starter to allow the ignition or starter to be activated so that the vehicle 105 can operate in a drive mode, e.g., move along a roadway or route. As another example, the vehicle computer 115 could be programmed to autonomously operate the vehicle on a planned route, e.g., to drive away from a parking location to a planned destination. The process 200 ends following the block 240.

In the block 245, the vehicle computer 115 may output a message to the user, via the HMI 145, indicating that the received input does not specify the password. Additionally and/or alternatively, the vehicle computer 115 may transmit the message, indicating that the received input does specify the password, to the user device 165 via the network 150 or Bluetooth.

In a decision block 250, the vehicle computer 115 may request from the user, via the HMI 145, the network 150 or Bluetooth, to re-attempt entering the password. As an example, the vehicle computer 115 may display the request on the HMI 145 and wait for the user to input a response. As another example, the vehicle computer 115 may transmit the request to the user device 165 via the network 150 or Bluetooth, and wait for the user device 165 to transmit a response. If the response received by the vehicle computer 115 indicates the user requests to re-attempt to enter the password, the process 200 goes to the block 230; otherwise, the process 200 ends.

FIG. 3 illustrates a process 300 for generating a password in the user device 165, based on a secret key and values displayed on the instrument panel 110. The process 300 can be carried out by the device 165 executing programming stored in its memory.

The process 300 may begin in a block 305, when the user device 165 receives an input from a user, requesting to access the vehicle 105. The user device 165 may receive the input from the user via the user device 165 touchscreen, keyboard, camera (capturing an image of data values, of a QR code, etc.) and/or microphone. The user device 165 is programmed to then request values needed to generate the password. The user device 165 may authenticate the user's identity by prompting the user to input a user identification, e.g., a user's name and/or a substantially unique alpha-numeric identifier, and a related password.

Next, in a block 310, the user device 165, in response to the input in the block 305, may transmit a request to the vehicle computer 115 to activate the instrument panel 110. The request may be a message from the user device 165 to the vehicle computer 115, via e.g., the network 150 or Bluetooth, to activate the instrument panel 110, e.g., display various current vehicle data values such as a current odometer reading, estimated distance-to-empty, current fuel efficiency, external temperature reading, and/or a current radio station.

Next, in a block 315, the user device 165 retrieves the secret key from the user device 165 memory or storage.

In one example, where the user may have access to multiple vehicles 105, the user device 165 memory may include a plurality of secret keys. Each secret key may be associated to a respective vehicle 105. In such a case, the user device 165 may retrieve the secret key associated to a vehicle 105 based on a substantially unique vehicle identifier, e.g., a Vehicle Identification Number (VIN) or the like. For example, in addition to prompting the user to input user identification, e.g., a user's name and/or a substantially unique alpha-numeric identifier, and a related password, the user device 165 may prompt the user to input the vehicle identification. As another example, the vehicle computer 115 may transmit a message, indicating the secret key associated with the vehicle 105, to the user device 165 via, e.g., Bluetooth or WiFi.

As an alternative to receiving the secret key from the server 155 or the vehicle computer 115, the user device 165 may verify that the user is initially authorized to access the vehicle 105, generate the secret key, e.g., using a random data generating function, store the secret key in the user device 165 memory, and transmit the secret key to the data store 120.

In a block 320, the user device 165 obtains one or more values (i.e., vehicle data) being displayed on the instrument panel 110, e.g., by the vehicle computer 115 as explained above regarding the process 200. The vehicle data may be combined with the secret key to generate the password, as further explained below regarding in a block 325.

After selecting the data field(s) to be used for generating the password, the vehicle computer 115 may display the selected data field(s) on the HMI 145 for the user to observe. Upon observing the selected data fields, the user may input the vehicle data for the selected data field(s) into the user device 165. Additionally and/or alternatively, the user device 165 may receive the data field(s) and/or the vehicle data of the selected data field(s) from the vehicle computer 115. In the example where the user device 165 receives the selected data field(s), the user device 165 may prompt the user for the values associated with each of the selected data field(s).

The vehicle computer 115 may generate the cryptographic nonce, as discussed above. In such a case, the vehicle computer 115 may display the generated cryptographic nonce on the HMI 145 for the user to see, such that the user can input the cryptographic nonce into the user device 165. Additionally and/or alternatively, the user device 165 may receive the generated cryptographic nonce from the vehicle computer 115.

Next, in the block 325, the user device 165 may combine the selected vehicle data and/or the cryptographic nonce with the secret key using a cryptographic algorithm or a One-Time Password (OTP) algorithm, as discussed above.

As an example, the user device 165 may apply an OTP algorithm as described above. In such a case, the user device 165 may input the shared secret key and the selected data values into the cryptographic hash function. Where there are two or more selected data values, the data values may be concatenated in the order selected by and received from the vehicle computer 115, and the user device 165 may input the resulting concatenation into the cryptographic hash function, which then generates the password.

In the block 330, the user device 165 may output the generated password. As an example, the user device 165 may display the generated password on the user device 165 touchscreen. As another example, the user device 165 may transmit the generated password to the vehicle computer 115 via the network 150 or Bluetooth. In such an example, the vehicle computer 115 may send a command to the user device 165 requesting the generated password, via the network 150 or Bluetooth®, and the user device 165 may transmit the generated password to the vehicle computer 115, via the network or Bluetooth. The process 300 then ends.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A method, comprising:
obtaining, from a vehicle communications network, one or more values displayed on a vehicle instrument panel;
generating a password by combining the one or more displayed values and a stored secret key;
obtaining, in a mobile computer, input of the one or more values displayed on the vehicle instrument panel; and
generating the password by combining the one or more input values and the stored secret key.

2. The method of claim 1, further comprising, in the mobile computer, transmitting a request to the vehicle computer to actuate the vehicle instrument panel to display the one or more values.

3. The method of claim 2, further comprising, in the vehicle computer, receiving the request and actuating the vehicle instrument panel to display the one or more values upon receipt of the request.

4. The method of claim 1, further comprising, in the vehicle computer, receiving input providing the password.

5. The method of claim 4, further comprising, in the vehicle computer, actuating a vehicle component upon confirming that the received input includes the password.

6. The method of claim 4, further comprising, in the vehicle computer, receiving the input via wireless communication between the vehicle computer and a mobile computer.

7. The method of claim 1, further comprising, in the vehicle computer, selecting the secret key from a plurality of secret keys based on a user identification.

8. The method of claim 1, further comprising, in the mobile computer, outputting the password.

9. A system, comprising:
a vehicle computer programmed to:
obtain input of one or more values being displayed on a vehicle instrument panel; and
generate a password by combining the one or more input values and a stored secret key; and
a mobile computer programmed to:
obtain input of one or more values being displayed on the vehicle instrument panel; and generate the password by combining the one or more input values and the stored secret key.

10. The system of claim 9, wherein the mobile computer is further programmed to output the password.

11. The system of claim 9, wherein the vehicle computer is further programmed to receive input providing the password.

12. The system of claim 11, wherein the vehicle computer is further programmed to actuate a vehicle component upon confirming that the received input includes the password.

13. The system of claim 12, wherein the input is received via wireless communication between the vehicle computer and a mobile computer.

14. The system of claim 9, wherein the mobile computer is further programmed to transmit a request to the vehicle computer to actuate the vehicle instrument panel to display the one or more values.

15. The system of claim 14, wherein the vehicle computer is further programmed to receive the request and actuate the vehicle instrument panel to display the one or more values upon receipt of the request.

16. The system of claim 9, wherein the vehicle computer is further programmed to select the secret key from a plurality of secret keys based on a user identification.

* * * * *